United States Patent [19]
Kunz et al.

[11] Patent Number: 5,836,109
[45] Date of Patent: Nov. 17, 1998

[54] HANGING FLOWER PLANTER

[75] Inventors: Joseph Kunz, Kearny, N.J.; Morris Moskowitz, Monsey, N.Y.

[73] Assignee: Missry Associates, Inc., Dunellen, N.J.

[21] Appl. No.: 745,772

[22] Filed: Nov. 8, 1996

[51] Int. Cl.[6] ............................. A01G 9/02; A47G 7/02
[52] U.S. Cl. ................................. 47/67; 248/318
[58] Field of Search ................. 47/67, 39; 248/318, 248/322

[56] References Cited

U.S. PATENT DOCUMENTS

| 4,187,996 | 2/1980 | Ehrlich | 47/67 |
| 4,189,124 | 2/1980 | Faris | 47/67 |
| 4,556,184 | 12/1985 | O'Sullivan | 47/67 |
| 4,669,693 | 6/1987 | Kagan | 47/67 |

FOREIGN PATENT DOCUMENTS

| 0193253 | 9/1986 | European Pat. Off. | 47/67 |
| 2132172 | 6/1984 | United Kingdom | 47/67 |

*Primary Examiner*—Michael J. Carone
*Assistant Examiner*—Joanne C. Downs
*Attorney, Agent, or Firm*—Bauer & Schaffer

[57] ABSTRACT

A hanging planter having a bowl shaped container and a suspension assembly is provided. The suspension assembly comprises a plurality of stringers the lower ends of which are attached to the rim of the container. The upper end of the stringers are joined together in a rim shaped hub to which is removably connected a hook so that the hook and stringer assembly are rotatable relative to each other.

13 Claims, 2 Drawing Sheets

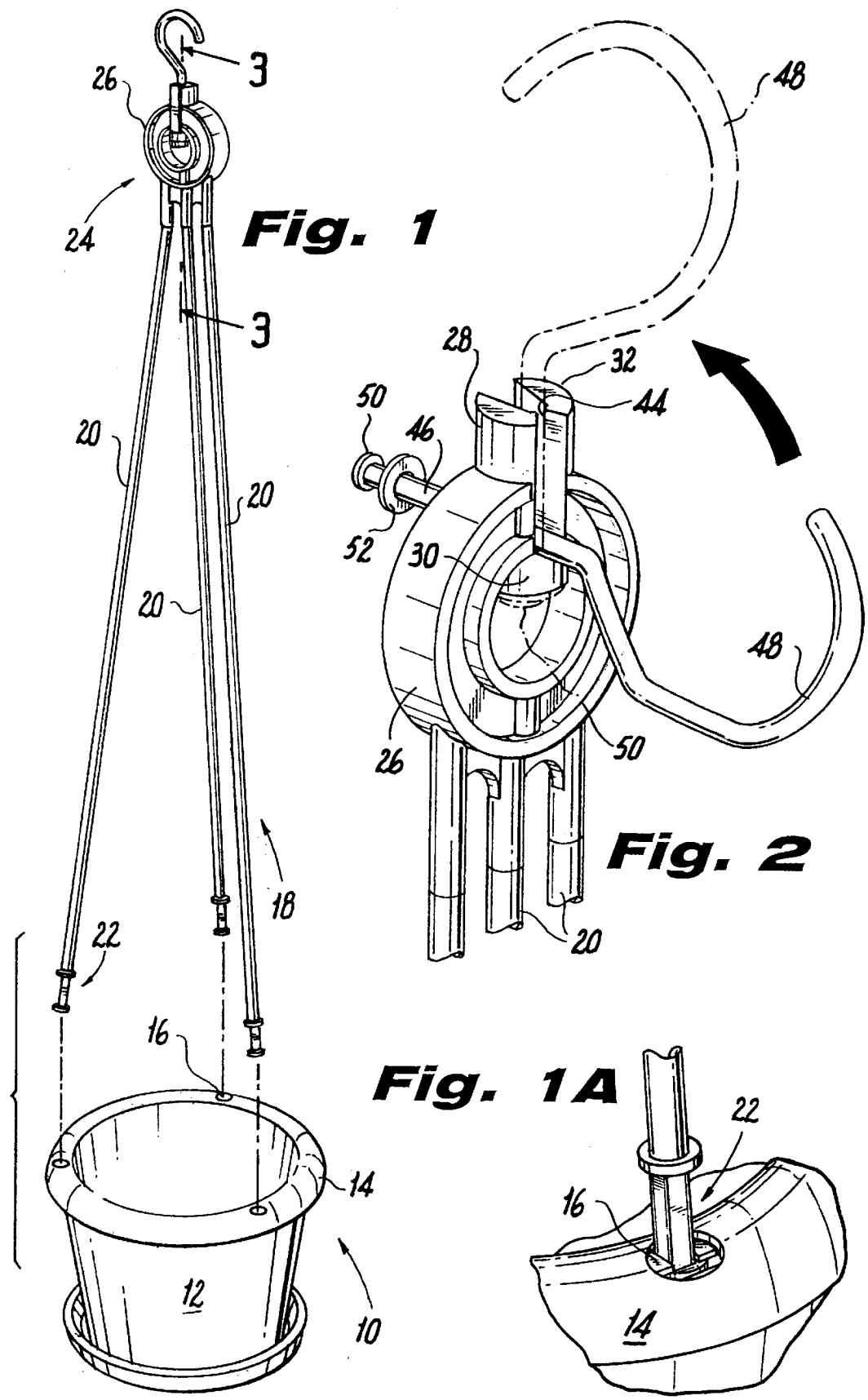

HANGING FLOWER PLANTER

BACKGROUND OF THE INVENTION

The present invention relates to flower planters, and in particular, to planters of the type adapted for hanging from a ceiling or wall.

Hanging planters have become common for exhibiting plants, holding cut flowers and the like, in homes, on terraces and other non-garden environments. Such planters are usually formed of decorative light weight plastic materials comprised of a pot or bowl having an upper lip or edge to which a plurality of stringers extend upwardly. The stringers are joined in a common suspension assembly including a central hook, by which the entire planter may be suspended. Reference to U.S. Pat. Nos. 4,622,776 dated Nov. 18, 1986 and 4,138,803 dated Feb. 13, 1979 show two versions of such planters.

A particular problem arises in the use of these planters, in that the stringers are fixed to the suspension hook permanently and in an integral manner. Because of this, rotation of the planter bowl causes the stringers to twist about themselves, thereby shortening the length at which the planter hangs, destabilizing the position of the bowl, enabling it to tip over and eventually causing the stringers to break. These problems are exacerbated by human nature, since the hanging planter is an attraction leading children, as well as adults to frequently playfully tap the bowl, to see it swing or rotate. Also, planter must be removed from Rod (and replaced) in order to rotate plant to sun for even Plant growth, and watering at selected locations.

It is the object of the present invention to provide a stringer and hook suspension assembly which overcomes the foregoing problems and disadvantages.

It is a particular object to provide a stringer assembly and suspension hook which are attached to each other so as to be relatively rotatable.

These advantages and other objects will be seen from the disclosure of the present invention to follow.

SUMMARY OF THE INVENTION

According to the present invention, a hanging planter having a bowl shaped container and a suspension assembly is provided. The suspension assembly comprising a plurality of stringers the lower ends of which are attached to the rim of the container. The upper end of the stringers are joined together in a rim shaped hub to which is removably connected a hook so that the hook and stringer assembly are rotatable relative to each other.

Full details of the present invention are set forth in the following description and illustrated in the accompanying drawing.

BRIEF DESCRIPTION OF THE DRAWINGS

In the Drawings:

FIG. 1 is a perspective partially exploded view of a planter and suspension assembly according to the teaching of the invention;

FIG. 2 is an exploded enlarged view of the stringer and hook assembly;

DESCRIPTION OF THE INVENTION

Figure 3:
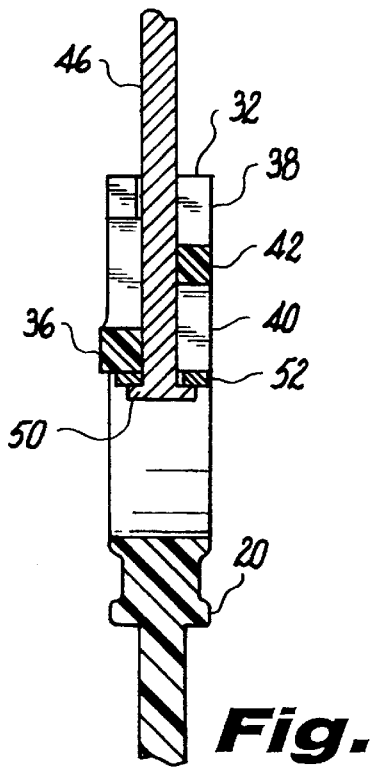
FIG. 3 is a sectional view taken along line 3—3 of FIG. 1.

As seen in FIG. 1, the present invention is applied to an otherwise conventional planter 10, comprising a bowl 12 of the usual bowl construction into which a plant, in a ceramic or clay flower pot or without such pot may be inserted. The bowl section 12 is provided with a radially extending peripheral rim 14 about its open edge in which a plurality of holes 16 are uniformly spaced. The planter includes a suspension assembly generally identified by the numeral 18 comprising a plurality of stringers 20, generally conforming in number to the number of holes 16. The stringers 20 are normally integrally joined to a common hook at their upper end and are provided at their lower ends with spaced annular flanges 22 which can be fit respectively through and into the holes 16, and which once so inserted can not be easily withdrawn.

The holes 16 are formed by the simple method of incising the material of the rim 14 in a T-shaped configuration. The T-shape allows the flange 22 to pass easily therethrough, but leave sufficient edge material to hold the flange in place. In practice, two flanges 22 are provided at the end of each stringer 20. In this manner, the length of the stringer may be adjusted in use to be either longer or shorter depending on the height of which the Planter is to be hung. The flanges 22 instead of being annular may be in the shape of barbs, hooks, or the like, and the holes conformingly incised. When placed in use, the weight of the bowl 12 incidental to suspension causes the flanges 22 to coact with the holes or notches creating a strong connection between the stringers as a suspension assembly and the pot.

Figure 4:
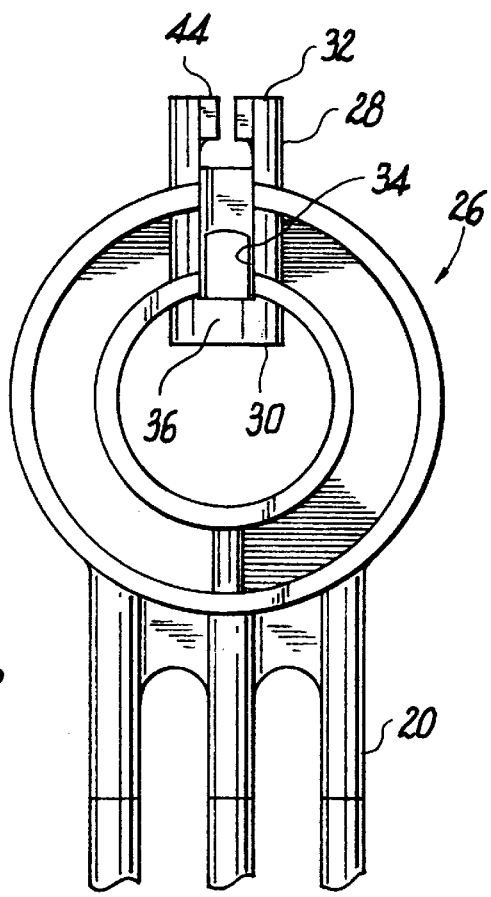
FIG. 4 is a front elevational view of the upper end of the stringer assembly as seen in FIG. 2, without the hooks.
Figure 5:
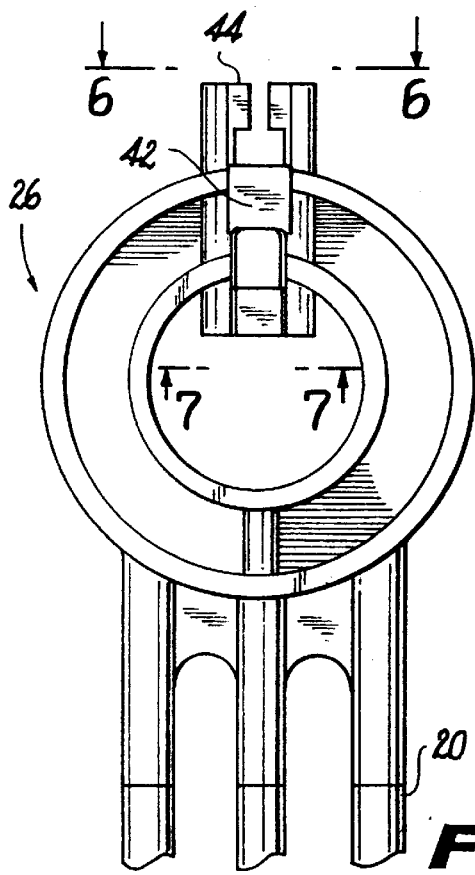
FIG. 5 is a rear elevational view of the upper end of the stringer assembly as seen in FIG. 2, without the hook.
Figure 6:
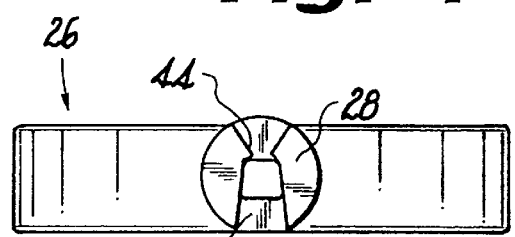
FIG. 6 is top plan view in the direction of plane 6—6 of FIG. 5.
Figure 7:
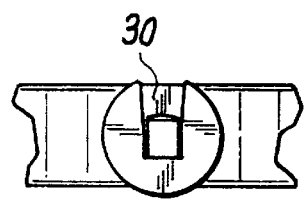
FIG. 7 is a lower plan view in the direction of plane 7—7 of FIG. 5.

The present invention provides a unique suspension assembly, generally depicted by the numeral 24 by which the hook is rotatable with respect to the bowl 12. As seen in more detail in FIGS. 2–7, the elongated stringers 20 are integrally attached at their upper ends, (as during the molding thereof) substantially together at the same point, to the periphery of a double ring shaped hub, generally depicted by the numeral 26. The hub 26 is given an I-Beam shape in cross section for strength as well as for reduction in material used. Molded integrally with the double ring hub 26 diametrically opposed to the stringers 20 is a hollow tubular socket 28 extending at its lower end 30 into the center of the hub and at its outer end 32 beyond the periphery of the ring. One side of the wall of the tubular socket 28 is formed with a longitudinal open slot 34 (FIG. 4), extending from the outer end 32 to a point short of the interior ring of the hub 26 leaving the wall portion 36 of the socket 28 directly below the slot 34 within the center of the ring circumferentially continuous and integral with the hub 26. Opposite to the slot 34, the socket 28 is formed with a pair of small longitudinal slots 38 and 40 at each end, separated by a solid portion 42 (FIG. 5) remaining integrally formed with the hub 26. Lastly, the upper or outwardly extending end 32 of the socket 28 is formed so that each of the inward edges of the socket walls forming the slot 24, is formed with a vertical nub or flange 44 respectively.

The hook 22 is formed with a round stem 46 and a conventional C shaped head 48. The lower end of the stem is provided with a small disk shaped cap 50, which may be threaded or glued to the end of the stem to form a fixed seat over which a washer 52 is freely placed. The cap may be replaced by a small ball having a central hole, the ball being swaged and fixed over the end of the stem. Another modification may be the use of an array of spikes or barbs which angularly protrude from the surface adjacent the end of the stem, which will engage below the frontal end of the socket and act as a seat and washer. While the hook 48 may also be made of plastic, it is preferred that it be formed of relatively large gauge wire having integral heads instead of the washer 52 formed at its end (such as 10 gauge), for strength and durability which is also not affected by rays and heat from sun.

In assembling the hook and stringer assembly, the lower end of the stem, i.e. with the cap 50 with washer 52 seated thereon is placed through the hollow tubular socket 28. Actually, the stem 46 is threaded through the opposing slots 38 and 40 and wall portions of the socket, so that it passes into the center of the double ring hub 28. Thereafter, the stem 46 is snapped into the vertical flanges 44 concentric with the axis of the socket. In the snapped-in position, the cap 50 and the washer 52 abut the lower frontal end of the socket extension 30, and the stem coacts with the flanges 44 to remain removably fixed within the socket while being simultaneously swivelable relative therewith.

It will thus be seen that the swivel connection between the stringer assembly and the hook permits the planter to rotate and move relatively freely without twisting the stringers. The swivel connection is furthermore easily disassembled for ease of shipment and packaging as well as permitting various hooks and stringers to be substituted or replaced.

Neither the shape nor cross section of the ring nor material from which it or the stringers or hooks are made are critical. Plastic or metal may be used.

Various embodiment modifications and changes have been shown. Others will be obvious to those skilled in the art. Accordingly, it is intended that the present invention, not be limited by its disclosure, being illustrative only, but only by the accompanying claims.

What is claimed is:

1. A hanging flower planter comprising a bowl shaped container having a rim about its upper edge, a suspension assembly having a plurality of elongated elements attached at one end to the rim of the container and at their other end to a hook by which said planter may be hung, the other ends of said elongated elements being integrally secured to a common hub, and means for attaching said hub to said hook for free relative rotation of each of said hub and hook so that said container and hook are independently rotatable.

2. The flower planter according to claim 1, wherein said hub is formed with a radially extending hole, said hook is provided with an elongate stem fitting into said hole, and said hub includes means for securing said stem in said hole to permit said relative rotation.

3. The flower planter according to claim 2, wherein said hub comprises a ring having a periphery to which the other ends of said elongate elements are secured, said ring extending radially opposite to the elongate elements into which the stem of said hook is freely inserted, and a cap secured at the end of said stem to hold said hook within said hole.

4. The flower planter according to claim 3, wherein said cap is integrally secured to the end of said stem.

5. The flower planter according to claim 4, including washer means interposed between said cap and said ring.

6. A hanging flower planter comprising a bowl shaped container having a rim about its upper edge and a suspension assembly having a plurality of elongated stringers attached at one end to the rim of the bowl and at their other end to a hook by which said planter may be hung, an annual or hub to which the other ends of the elongated stringers are fixedly secured at substantially a common point on the periphery of the hub, said hub having integrally formed therewith a radially extending hollow tube diametrically opposed to the common point, said hook having a stem freely insertable into said tube and means bearing against the end of said stem within said hub for preventing withdrawal of said hook from said tube, whereas said hook is freely rotatable within said tube independent of said hub.

7. The flower planter according to claim 6, including a washer interposed between said bearing means and end of said tube.

8. The flower planter according to claim 7, wherein said means for preventing withdrawal of said hook comprises a cap fixed to the end of said stem.

9. The flower planter according to claim 7, wherein said means for preventing withdrawal of said hook comprises a ball element fit over the end of said stem.

10. The flower planter according to claim 7, wherein said means for preventing withdrawal of said hook comprises a plurality of radial barbs formed on the surface of said stem adjacent its end.

11. The flower planter according to claim 7, wherein said tube is provided with longitudinally extending slots on opposite sides thereof, said slots being longitudinally offset to permit said stem to be inserted therein while said tube is integral with said hub.

12. The flower planter according to claim 11, wherein an upper end of said tube is provided with radially inward flanges to secure said stem therein.

13. The flower planter according to claim 6 wherein said hub is a double ring having an I-Beam shaped cross section.

* * * * *

UNITED STATES PATENT AND TRADEMARK OFFICE
CERTIFICATE OF CORRECTION

PATENT NO.    : 5,836,109
DATED         : November 17, 1998
INVENTOR(S)   : Joseph Kunz, et al.

It is certified that error appears in the above-identified patent and that said Letters Patent are hereby corrected as shown below:

Claim 7, column 4, line 28:

after "and", insert --an--.

Signed and Sealed this

Thirtieth Day of March, 1999

Attest:

Q. TODD DICKINSON

Attesting Officer

Acting Commissioner of Patents and Trademarks